US009743777B2

(12) United States Patent
Saiga et al.

(10) Patent No.: US 9,743,777 B2
(45) Date of Patent: Aug. 29, 2017

(54) DRAWN INSTRUMENT FOR SECURELY ATTACHING A COVER

(71) Applicant: YKK Corporation, Tokyo (JP)

(72) Inventors: Shinsuke Saiga, Tokyo (JP); Tetsuya Yoshino, Novi, MI (US); Yoshitomo Iyoda, Tokyo (JP)

(73) Assignee: YKK Corporation (JP)

( * ) Notice: Subject to any disclaimer, the term of this patent is extended or adjusted under 35 U.S.C. 154(b) by 0 days.

(21) Appl. No.: 15/030,487

(22) PCT Filed: Nov. 11, 2013

(86) PCT No.: PCT/JP2013/080482
§ 371 (c)(1),
(2) Date: Apr. 19, 2016

(87) PCT Pub. No.: WO2015/068311
PCT Pub. Date: May 14, 2015

(65) Prior Publication Data
US 2016/0249746 A1   Sep. 1, 2016

(51) Int. Cl.
*A47C 31/02* (2006.01)
*B68G 7/12* (2006.01)
(Continued)

(52) U.S. Cl.
CPC ............ *A47C 31/02* (2013.01); *A47C 31/023* (2013.01); *B60N 2/5825* (2013.01); *B68G 7/12* (2013.01); *F16B 2/22* (2013.01)

(58) Field of Classification Search
CPC .... A47C 31/02; A47C 31/023; B60N 2/5825; B68G 7/052; B68G 7/12; F16B 2/22
See application file for complete search history.

(56) References Cited

U.S. PATENT DOCUMENTS 6,048,025 A     4/2000   Tillner
7,487,575 B2 *  2/2009   Smith ................. B60N 2/5825
                                                        24/297
(Continued)

FOREIGN PATENT DOCUMENTS

JP    2006-95093 A    4/2006
JP    2011-45469 A    3/2011
(Continued)

OTHER PUBLICATIONS

International Preliminary Report on Patentability, PCT Application No. PCT/JP2013/080482, mailed May 26, 2016.
(Continued)

*Primary Examiner* — David Upchurch
(74) *Attorney, Agent, or Firm* — Kilpatrick Townsend & Stockton LLP

(57) ABSTRACT

A drawn instrument for securely attaching a cover includes a tape member having left and right surfaces and attachable to a cover, and a drawn portion provided at the end of the tape member and projected from the left and right surfaces of the tape member, the drawn portion extending along the end of the tape member. The drawn portion includes a plurality of attached portions for clip attachment that are separated along the longitudinal direction of the drawn portion and are recessed at both left and right sides, and a plurality of walls separated along the longitudinal direction of the drawn portion and projected at both left and right sides. At both left and right sides each wall is provided adjacent to the attached portion and positioned inwardly of the tape member relative to the attached portion.

13 Claims, 17 Drawing Sheets

(51) Int. Cl.
    *B60N 2/58*    (2006.01)
    *F16B 2/22*    (2006.01)

(56) References Cited

U.S. PATENT DOCUMENTS

| | | | | |
|---|---|---|---|---|
| 7,568,761 | B2* | 8/2009 | Mashimo | B68G 7/052 |
| | | | | 297/218.1 |
| 8,099,837 | B2* | 1/2012 | Santin | A47C 31/023 |
| | | | | 24/297 |
| 8,197,010 | B2* | 6/2012 | Galbreath | B60N 2/5825 |
| | | | | 297/218.2 |
| 2003/0215601 | A1* | 11/2003 | Pedde | B29C 33/12 |
| | | | | 428/102 |
| 2005/0006944 | A1* | 1/2005 | Ali | B60N 2/5825 |
| | | | | 297/452.6 |
| 2007/0257531 | A1 | 11/2007 | Mashimo | |
| 2009/0140569 | A1* | 6/2009 | Mashimo | B60N 2/5825 |
| | | | | 297/452.59 |
| 2012/0284974 | A1* | 11/2012 | Yamamoto | A47C 31/023 |
| | | | | 24/458 |
| 2013/0117973 | A1* | 5/2013 | Murasaki | A47C 31/023 |
| | | | | 24/581.11 |

FOREIGN PATENT DOCUMENTS

| | | |
|---|---|---|
| JP | 3186511 U | 10/2013 |
| WO | 2008/050393 A1 | 5/2008 |
| WO | 2013/069114 A1 | 5/2013 |

OTHER PUBLICATIONS

International Search Report, PCT Application No. PCT/JP2013/080482, mailed Dec. 3, 2013.

\* cited by examiner

DRAWN INSTRUMENT FOR SECURELY ATTACHING A COVER

TECHNICAL FIELD

The present invention relates to a drawn instrument for securely attaching a cover.

BACKGROUND ART

Patent document 1 discloses, as shown in its FIG. 1, a drawn instrument (8) for securely attaching a cover. This drawn instrument (8) for securely attaching a cover has an elongated tape (6) and blocks (7) where flexible joints (71) are provided between the adjacent blocks (7). According to such a configuration, sufficient flexibility may be obtained due to the joints (71) providing flexibility, and sufficient stiffness may be ensured due to the blocks (7).

Patent document 2 discloses, as shown in its FIGS. 3 and 4, a structure where a lock element (1) passes through an opening (14) of a flag (9) to grasp a pulled rod (8). The lock element (1) is also provided with a space (4) for accommodating a holding element (6). The attachment method of the lock element (1) to the flag (9) would be appreciated with reference to FIGS. 1 and 2 of the same document.

Patent document 3 discloses as in its FIG. 1 that: a chuck portion (6a) of a clip (6) is attached to a beading (3a) at a rim of a hanging cord (3) sewn to a trim cover (2), and an insert wire (4) is placed in a hook portion (6b) of the clip (6) so that the trim cover (2) is securely attached to a cushion pad (1). The shape of the clip in this document is shown in its FIG. 2.

CITATION LIST

Patent Literature

[PTL 1] International Publication No. 2013/069114
[PTL 2] U.S. Pat. No. 6,048,025
[PTL 3] Japanese Patent Application No. 2006-95093 (U.S. Pat. No. 4,734,549)

SUMMARY OF INVENTION

Technical Problem

The present inventor has newly discovered a technical challenge for providing a drawn instrument for securely attaching a cover which may allow easier attaching operation.

Solution to Problem

A drawn instrument for securely attaching a cover according to one embodiment of the present invention may be a drawn instrument (100) comprising:
 a tape member (10) having left and right surfaces (11, 12) and attachable to a cover (910); and
 a drawn portion (20) provided at the end of the tape member (10) and projected from the left and right surfaces (11, 12) of the tape member (10), the drawn portion extending along the end of the tape member (10). The drawn portion (20) may comprise:
 a plurality of attached portions (30) for clip attachment that are separated along the longitudinal direction of the drawn portion (20) and are recessed at both left and right sides; and
 a plurality of walls (40) separated along the longitudinal direction of the drawn portion (20) and projected at both left and right sides. At both left and right sides each wall (40) may be provided adjacent to the attached portion (30) and positioned inwardly of the tape member (10) relative to the attached portion (30).

The surface (411, 421) of the wall (40) being arranged inwardly of the tape member (10) may preferably be a curved surface or sloped surface which approaches the attached portion (30) as extending away from the left or right surface (11, 12) of the tape member (10).

The attached portion (30) may comprise a tapered portion (34) to which the clip is attachable, wherein a lateral groove (50) is provided between the wall (40) and the tapered portion (34), and wherein the left-right width of the tapered portion (34) gradually narrows as the tapered portion (34) extending away from the wall (40).

The tapered portion (34) may be provided with a vertical groove (60) which is in communication with the lateral groove (50) and extends away from the wall (40).

A unit according to another aspect of the present invention may be a unit comprising:
 a drawn instrument (100) for securely attaching a cover according to any one of above paragraphs; and
 a plurality of clips (70), each of which is attachable to the attached portion (30) of the drawn instrument (100) for attaching a cover.

Advantageous Effects of Invention

According to the present invention, a drawn instrument for securely attaching a cover which may allow easier attaching operation may be provided.

BRIEF DESCRIPTION OF DRAWINGS

In FIG. 2(a), an attached portion to which a clip will be attached is illustrated in an enlarged view from the left side. In FIG. 2(b), an attached portion to which a clip will be attached is illustrated in an enlarged view from the right side.

DESCRIPTION OF EMBODIMENTS

Hereinafter, exemplary embodiments of the present invention will be described with reference to drawings. Respective embodiments are not mutually exclusive, and the skilled person could properly combine them without requiring excess descriptions and could understand the synergic effects by such combinations. Overlapping descriptions among embodiments will basically omitted. Referenced drawings are mainly for the purpose of illustrating the invention and may be simplified in an appropriate manner.

In the present invention, terms indicating direction will be defined as follows. Left-Right direction corresponds to thickness direction of a tape member. Front-Back direction is equal to an extending direction or elongated direction of any arbitrarily configurable drawn instrument provided at and extending along the end of the tape member, where the Front-Back direction is orthogonal to the Left-Right direction. Up and down direction is orthogonal to the Left-Right direction and Front-Back direction. The UP-Down direction may possibly be recognized as a direction being equal to the drawn-in direction or pulled-in direction of the cover, or a direction being equal to the downward drawn direction of the tape member. Note that the skilled person would understand that the definitions of the terms indicating direction are presented for the sake of description, and could recognize other definitions based on the present disclosure of this application. Redefining the terms indicating direction should be possible unless it does not deteriorate the consistency of this whole disclosure of this application.

First Embodiment

Figure 1:
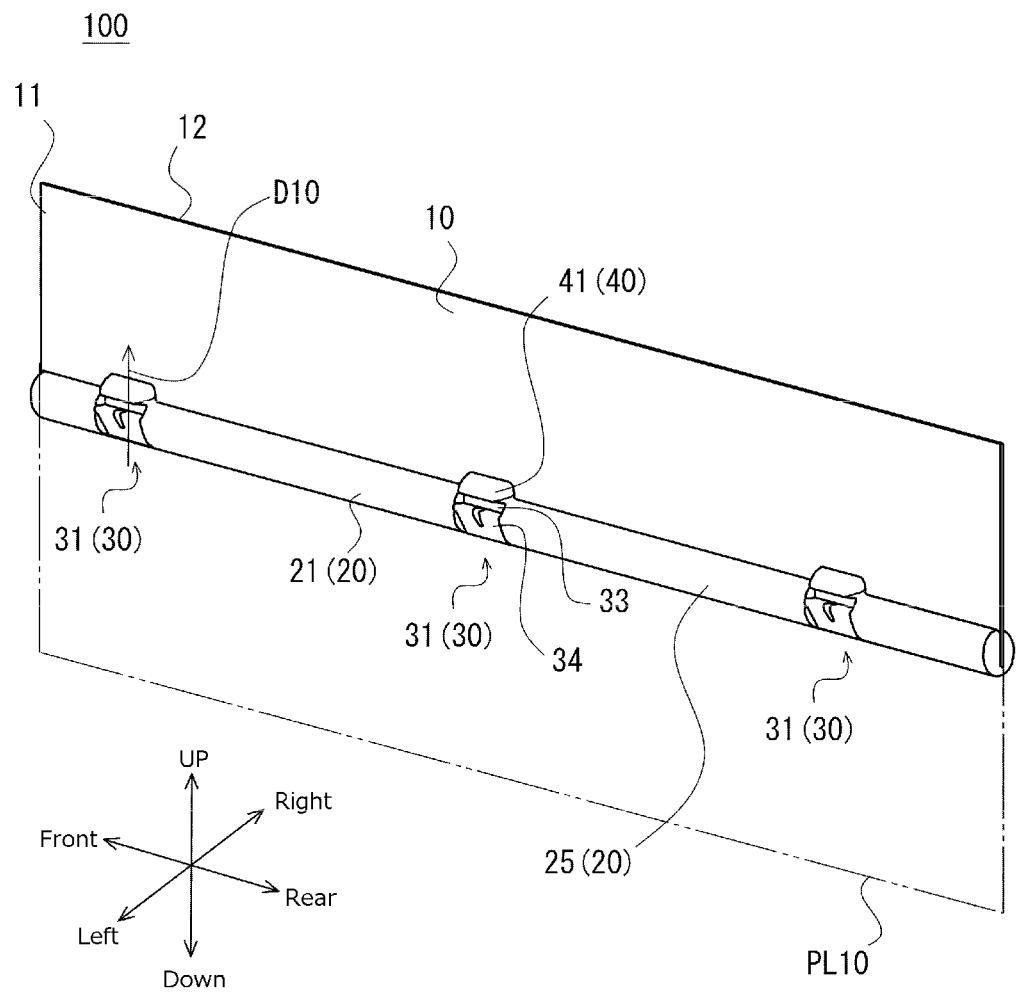
FIG. 1 is a perspective view of a drawn instrument for securely attaching a cover according to a first embodiment of the present invention, a plane PL10 is schematically illustrated herewith by a chain double-dashed line. A tape member exists on the plane PL10 or the tape member defines the plane PL10.
Figure 2:
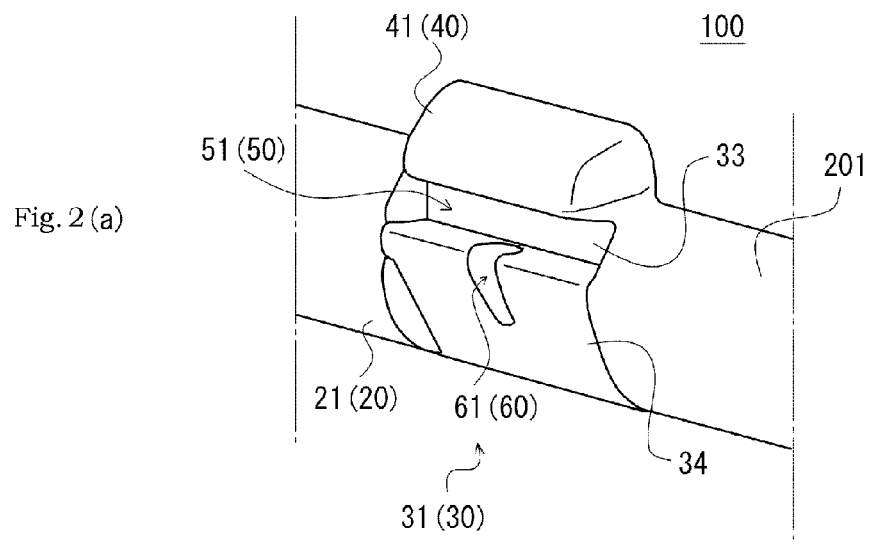
FIGS. 2(a) and 2(b), collectively referred to as FIG. 2 are partial perspective views of a drawn instrument for securely attaching a cover according to a first embodiment of the present invention.
Figure 2:
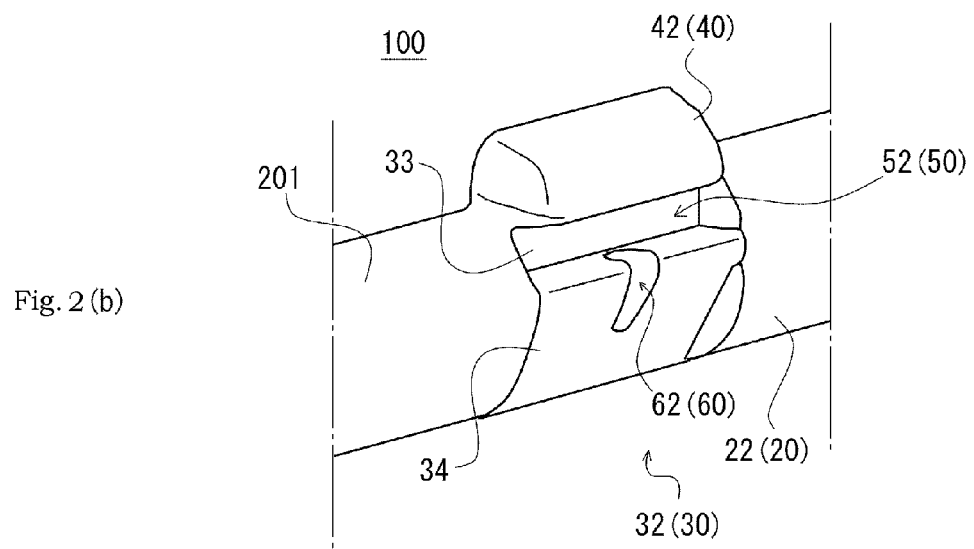
Figure 3:
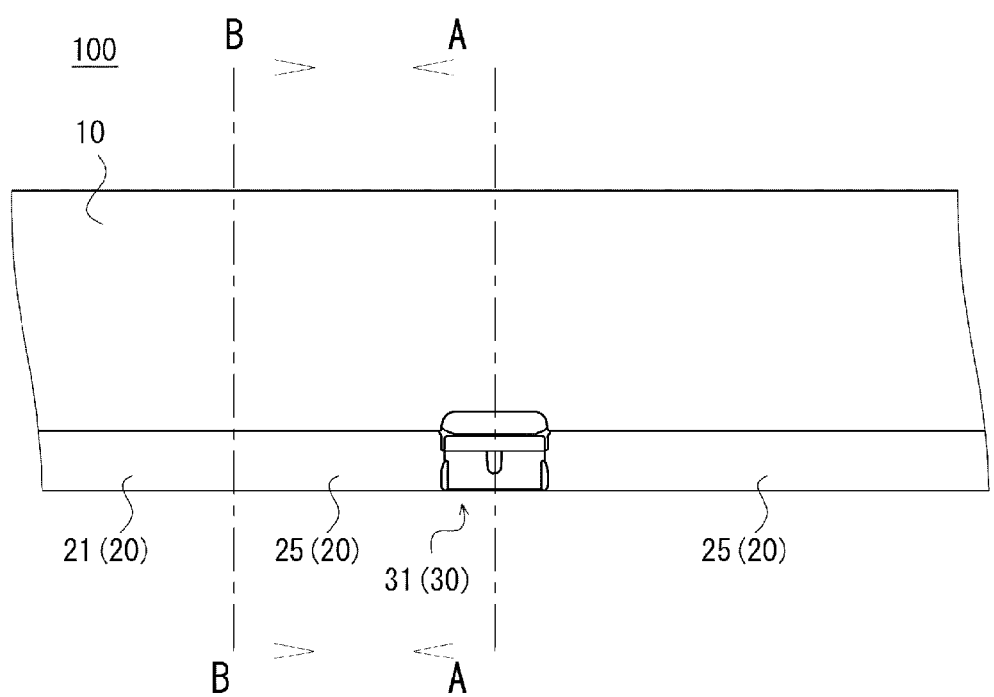
FIG. 3 is a left side front view of a drawn instrument for securely attaching a cover according to a first embodiment of the present invention. Herewith illustrated are an alternate long and short dashed line A-A set as illustrated at a location where the attached portion is provided, and an alternate long and short dashed line B-B set as illustrated where the attached portion is not provided.
Figure 4:
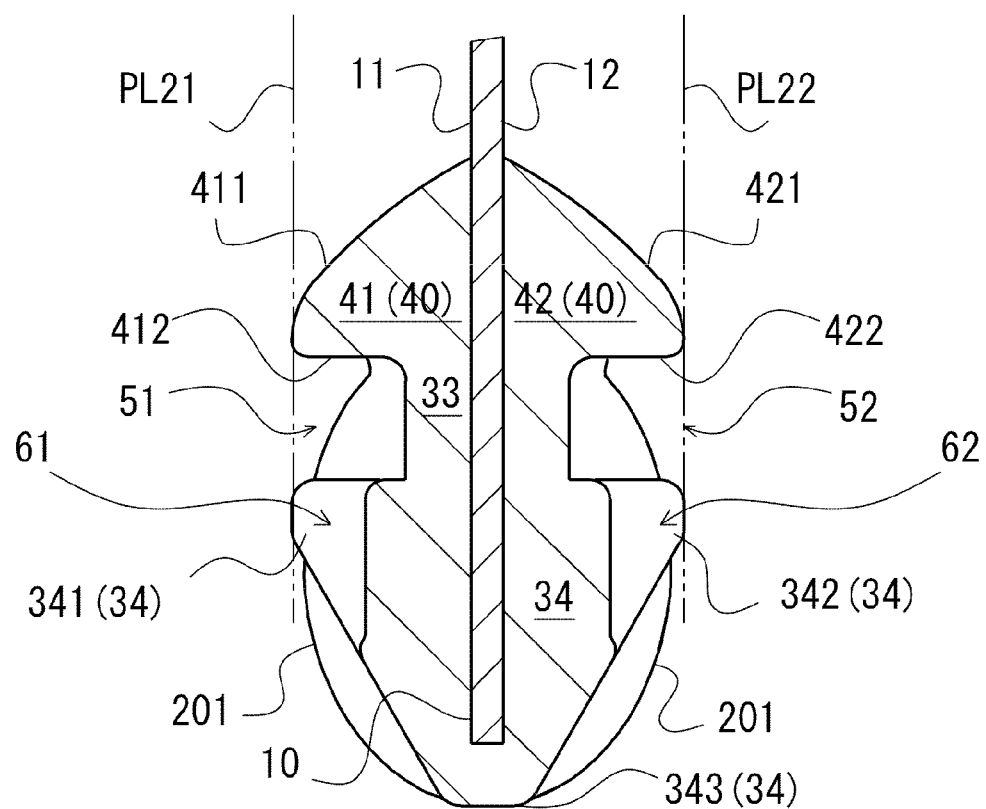
FIG. 4 is a schematic sectional view of a drawn instrument for securely attaching a cover according to a first embodiment of the present invention, illustrating a schematic section along the alternate long and short dashed line A-A in FIG. 3.
Figure 5:
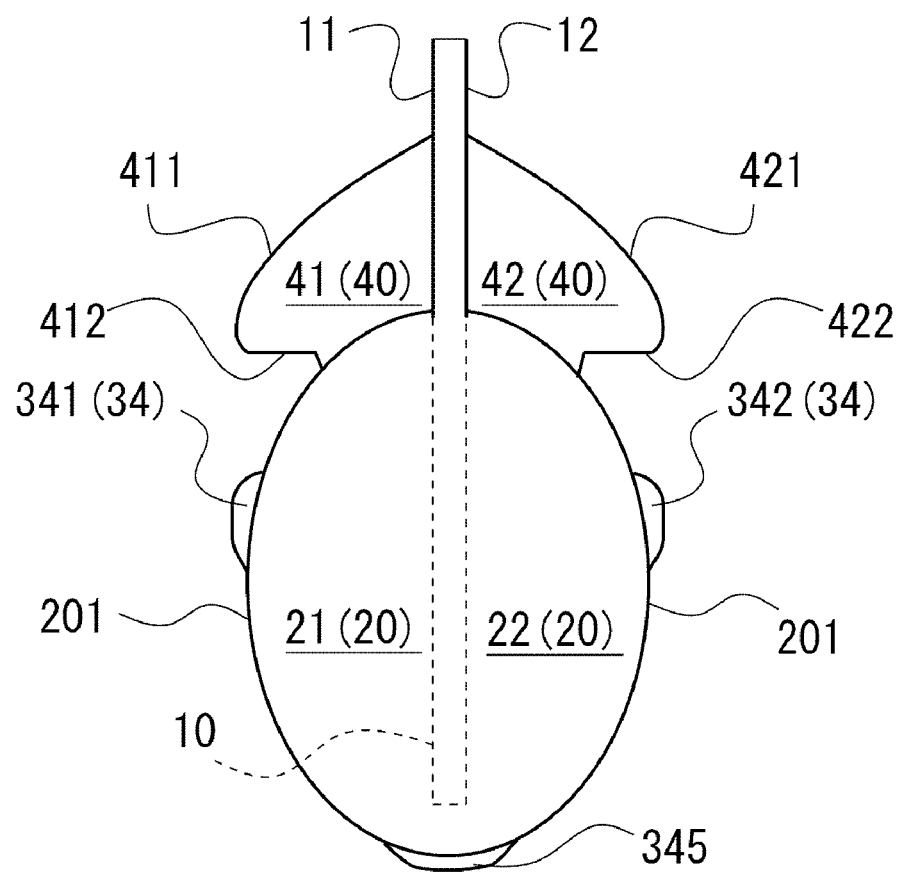
FIG. 5 is schematic sectional view of a drawn instrument for securely attaching a cover according to a first embodiment of the present invention, illustrating a schematic section along the alternate long and short dashed line B-B in FIG. 3.
Figure 6:
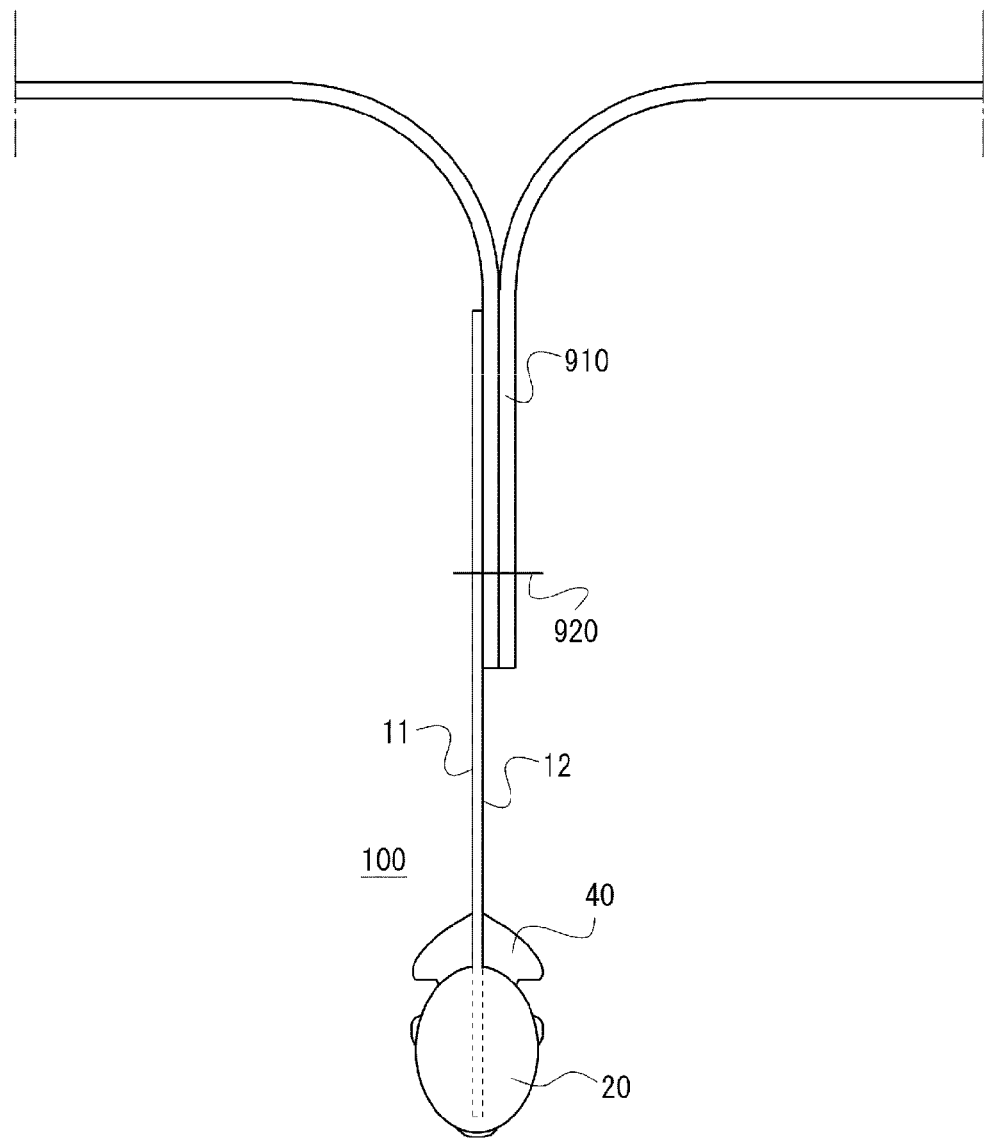
FIG. 6 is a schematic view illustrating a state where a drawn instrument for securely attaching a cover according to a first embodiment of the present invention is fixed, in this example sewn to a cover. A state is illustrated where a clip has been not yet attached to a drawn portion of the drawn instrument for securely attaching a cover.
Figure 7:
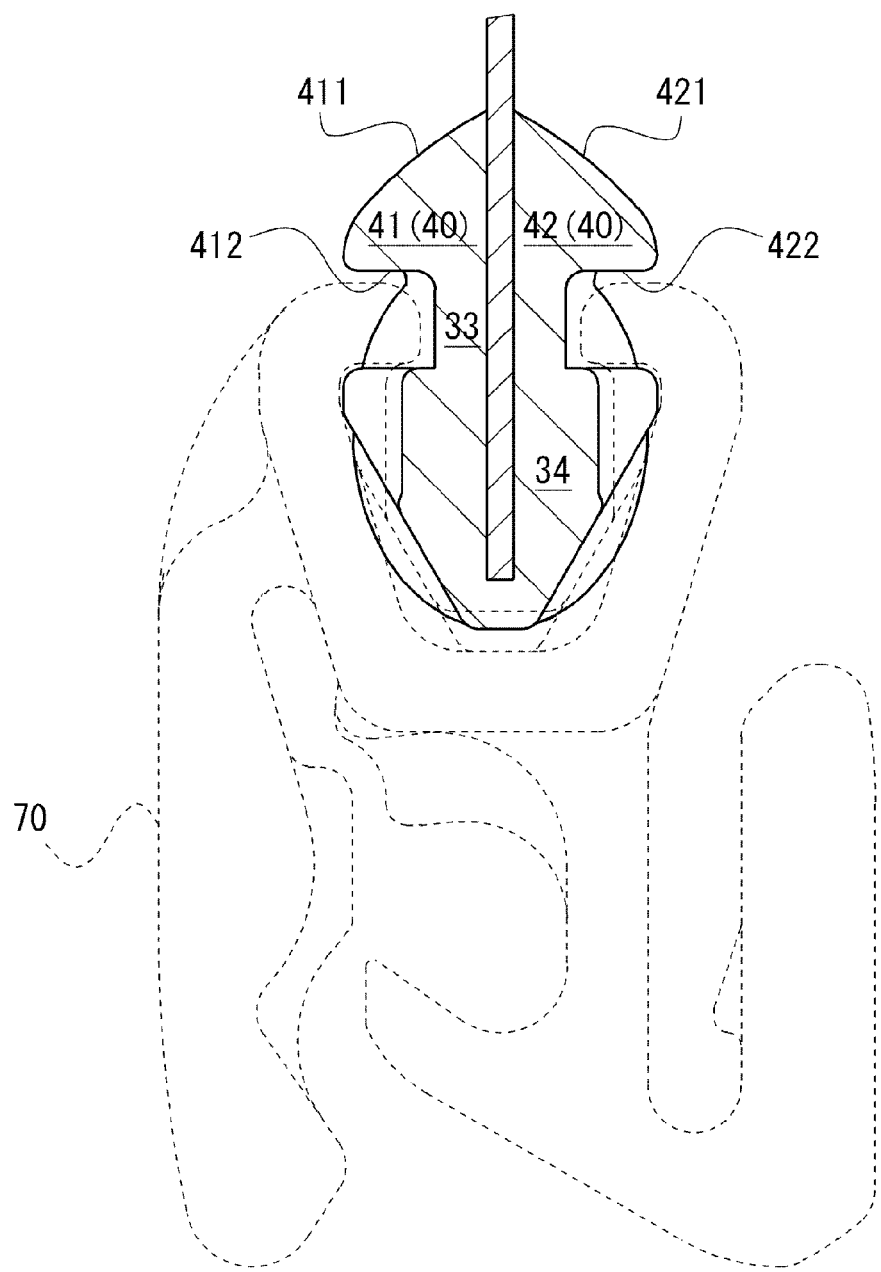
FIG. 7 is a schematic view illustrating that a clip has been attached to a drawn instrument for securely attaching a cover according to a first embodiment of the present invention. The sectional view of the drawn portion of the drawn instrument for securely attaching a cover corresponds to the sectional view in FIG. 4. The clip is shown by broken line for the sake of illustration.
Figure 8:
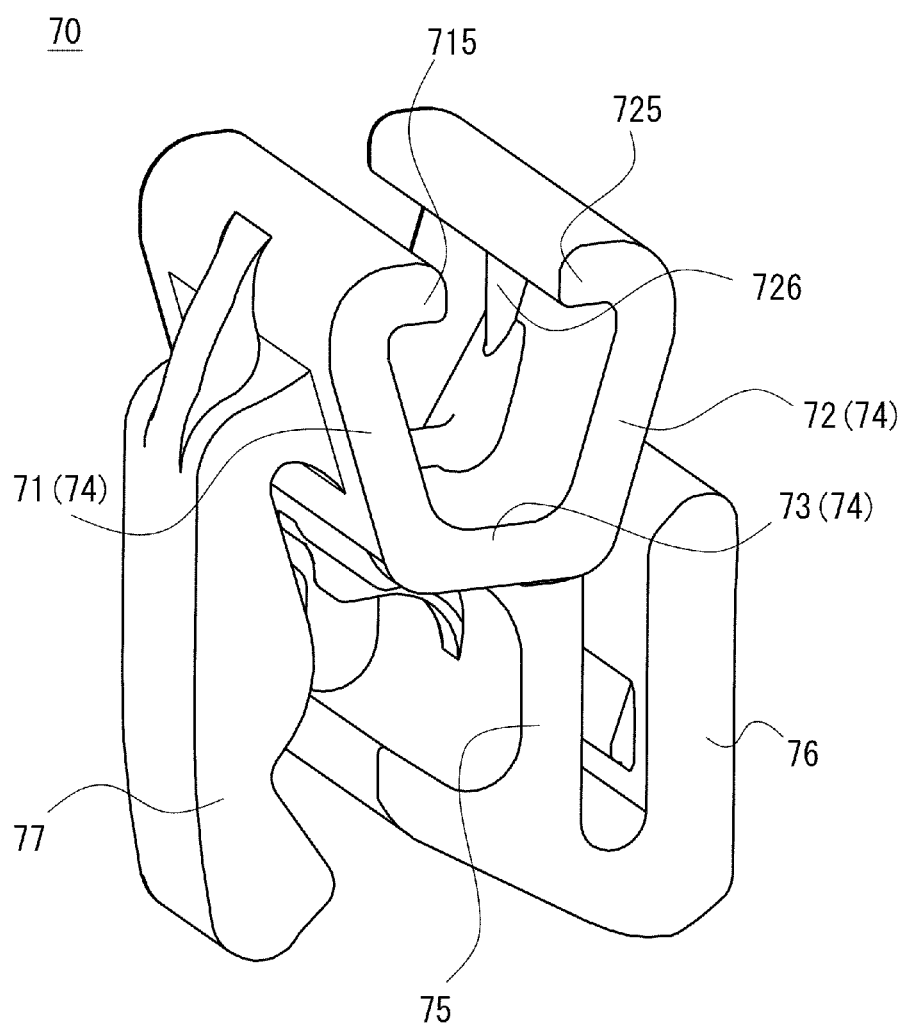
FIG. 8 is a schematic perspective view of a clip that may be attached to a drawn instrument for securely attaching a cover according to a first embodiment of the present invention.
Figure 9:
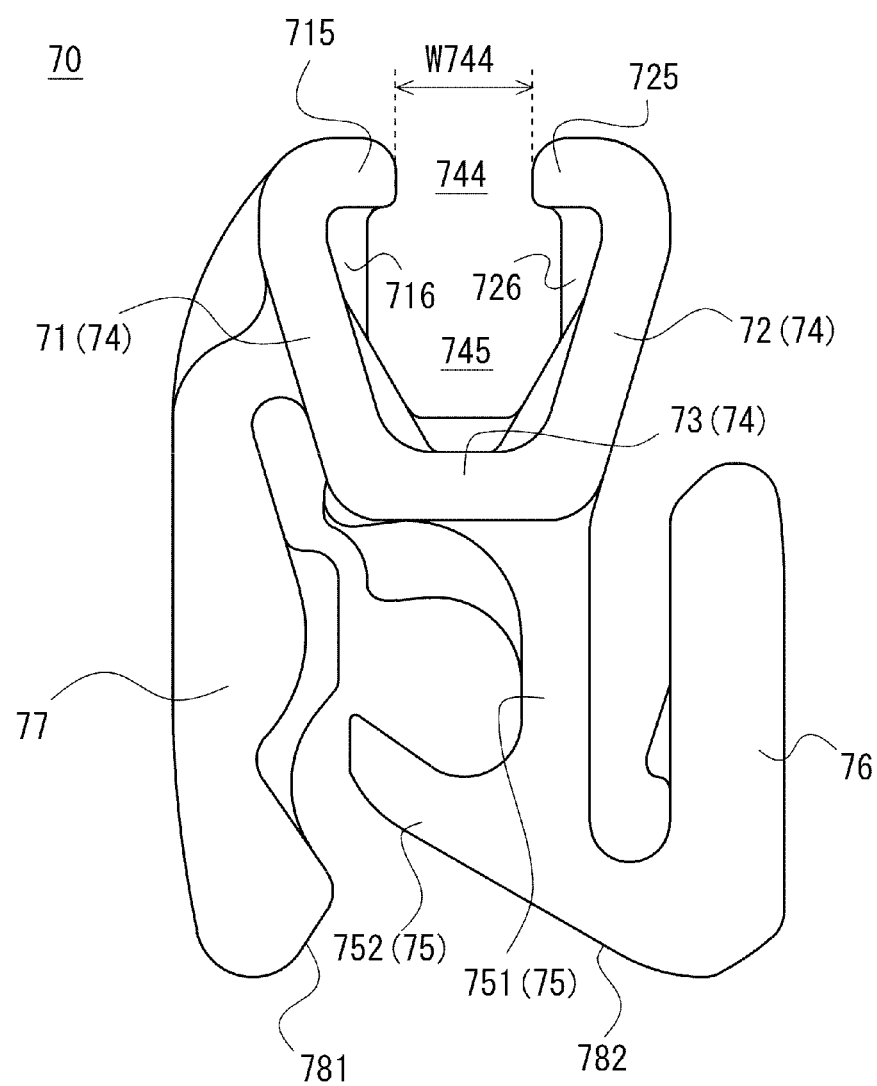
FIG. 9 is a schematic sectional view of a clip that may be attached to a drawn instrument for securely attaching a cover according to a first embodiment of the present invention.
Figure 10:
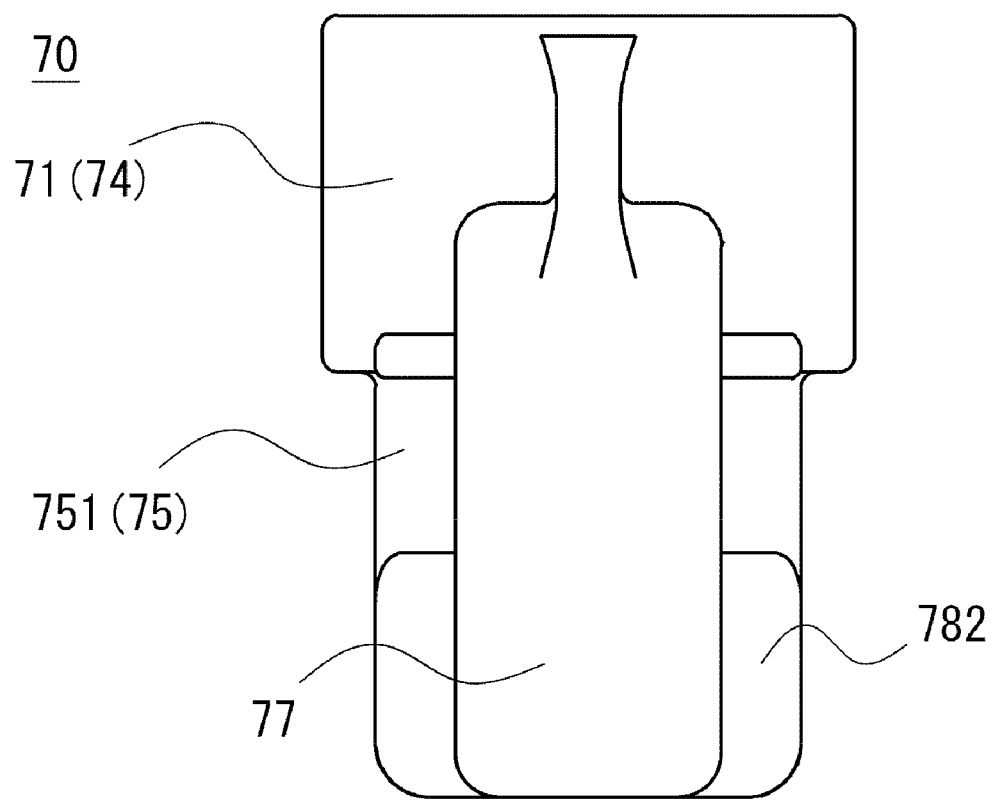
FIG. 10 is a schematic left side view of a clip that may be attached to a drawn instrument for securely attaching a cover according to a first embodiment of the present invention.
Figure 11:
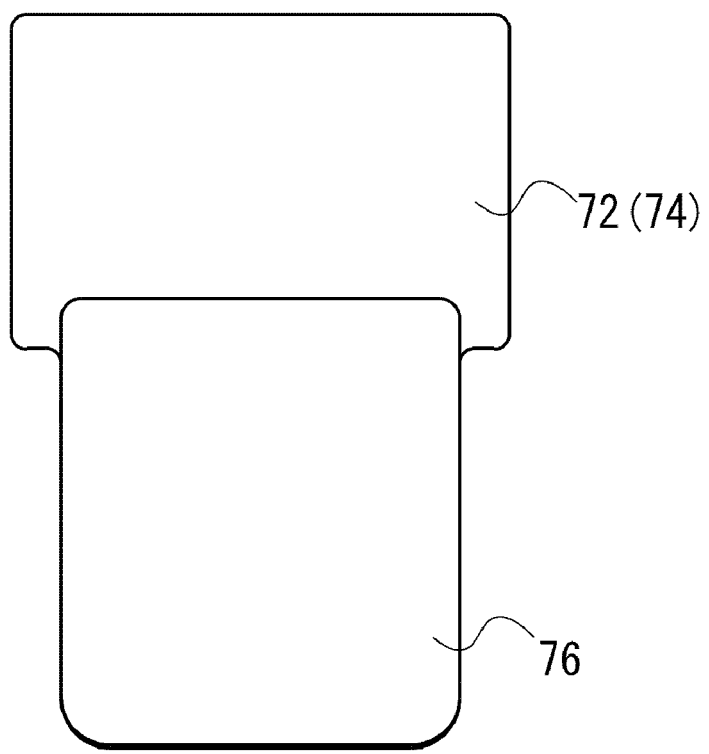
FIG. 11 is a schematic right side view of a clip that may be attached to a drawn instrument for securely attaching a cover according to a first embodiment of the present invention.
Figure 12:
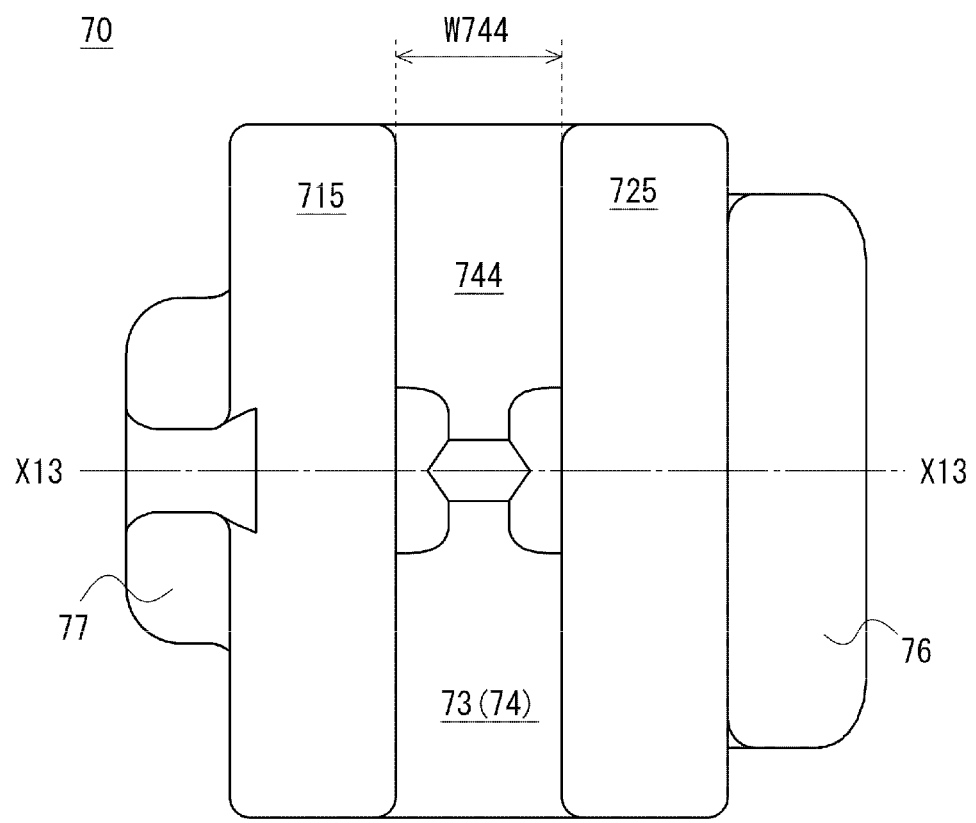
FIG. 12 is a schematic top view of a clip that may be attached to a drawn instrument for securely attaching a cover according to a first embodiment of the present invention.
Figure 13:
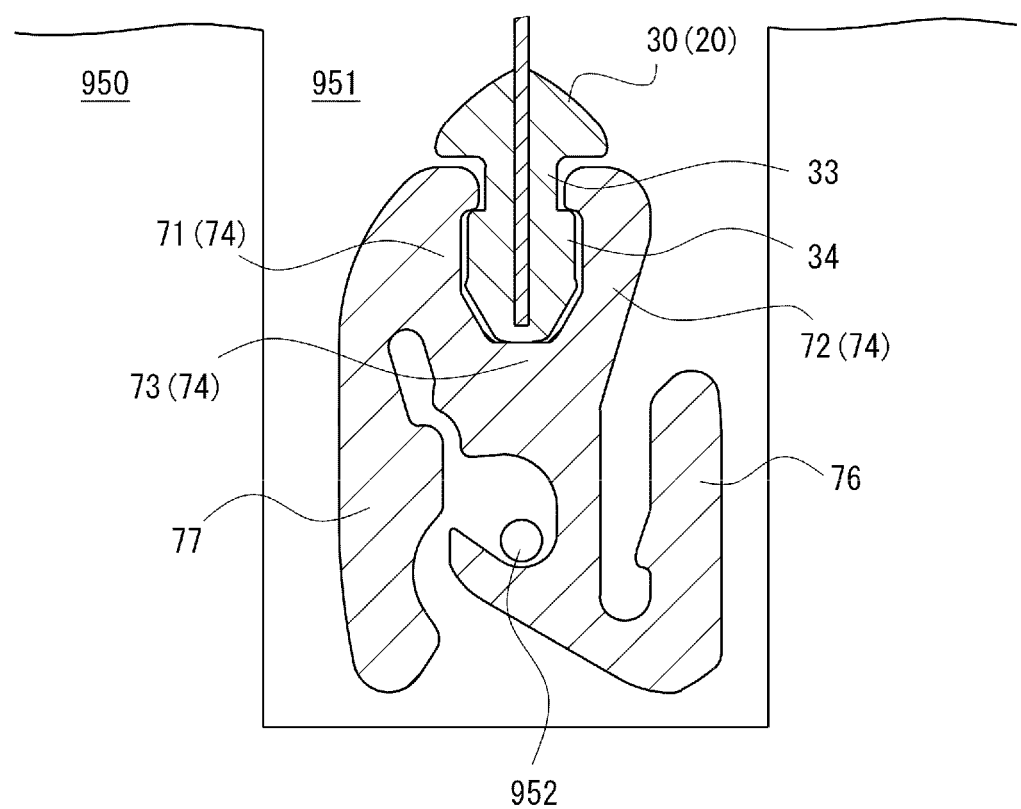
FIG. 13 is a schematic view illustrating a state where a drawn instrument for securely attaching a cover according to a first embodiment of the present invention has been coupled to an insert wire in a cushion member via a clip. The sectional view of a drawn instrument for securely attaching a cover and a clip corresponds to the sectional view along alternate long and short dashed line A-A in FIG. 3.
Figure 14:
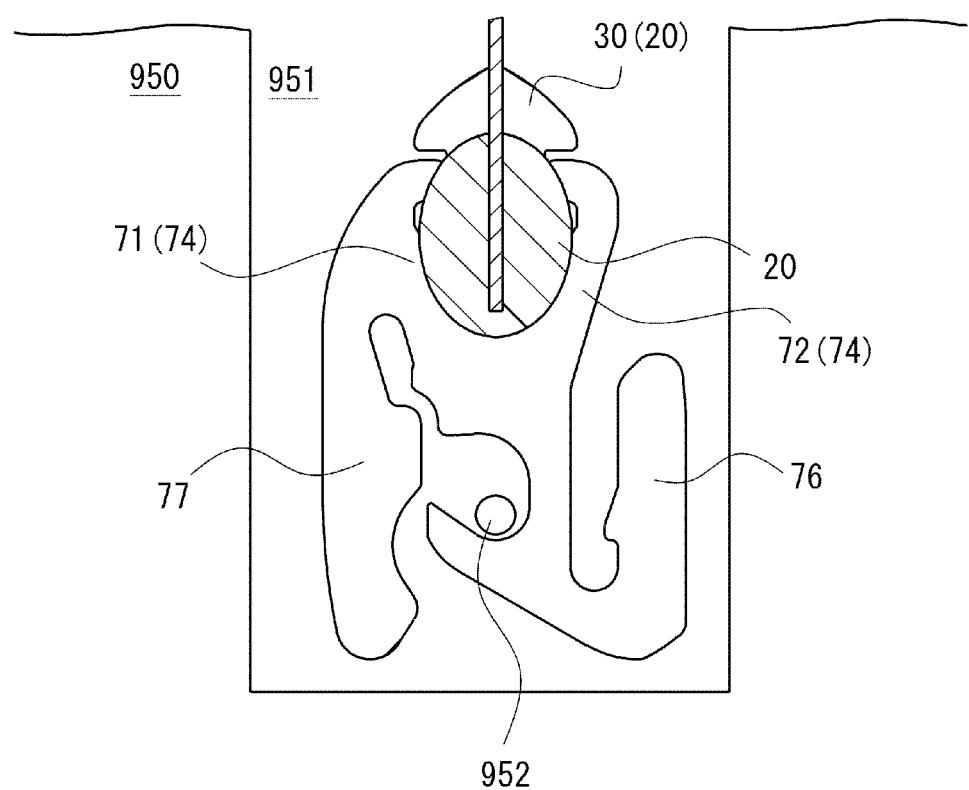
FIG. 14 is a schematic view illustrating a state where a drawn instrument for securely attaching a cover according to a first embodiment of the present invention has been coupled to an insert wire in a cushion member via a clip. The sectional view of a drawn instrument for securely attaching a cover corresponds to the sectional view along alternate long and short dashed line B-B in FIG. 3.
Figure 15:
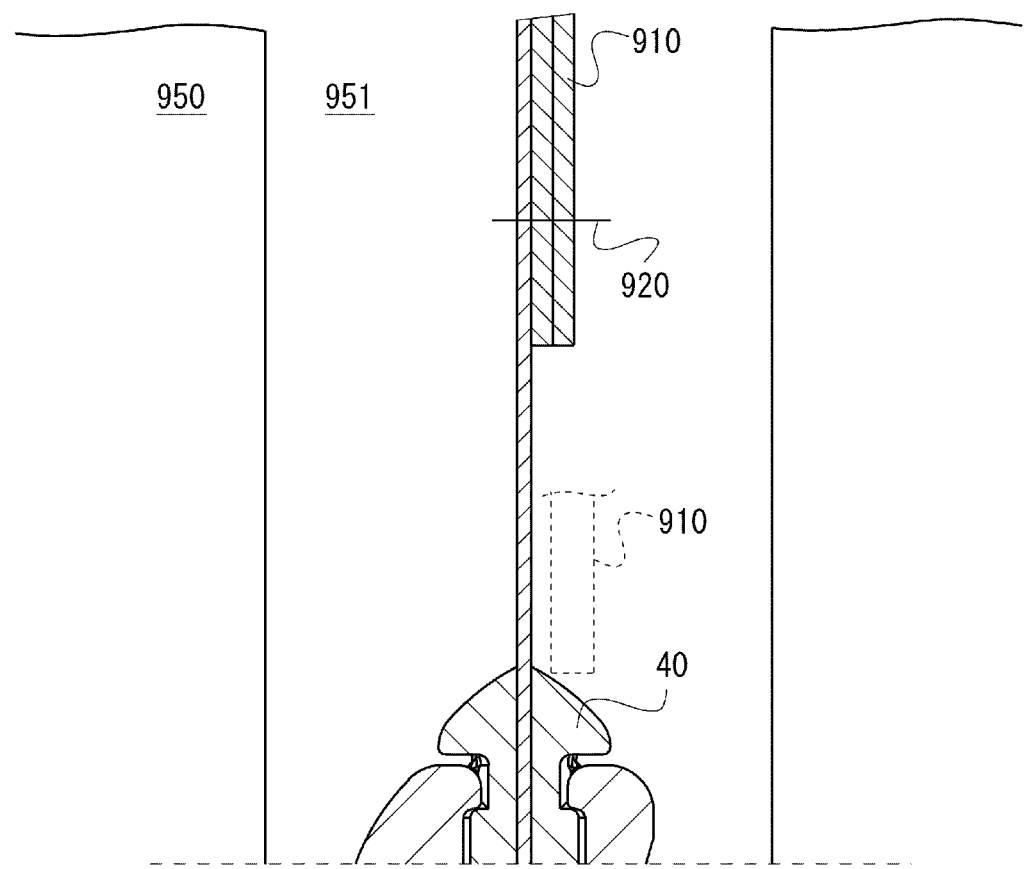
FIG. 15 is a partially enlarged view of a drawn instrument for securely attaching a cover according to a first embodiment of the present invention. The sound may be weakened which may be caused when a cover shown in dashed line hits a drawn portion of a drawn instrument for securely attaching a cover.

The first embodiment will be described with reference to FIGS. 1 to 15. FIG. 1 is a perspective view of a drawn instrument for securely attaching a cover, a plane PL10 is schematically illustrated herewith by a chain double-dashed line. A tape member exists on the plane PL10 or the tape member defines the plane PL10. FIG. 2 is a partial perspective view of a drawn instrument for securely attaching a cover. In FIG. 2(a), an attached portion to which a clip will be attached is illustrated in an enlarged view from the left side. In FIG. 2(b), an attached portion to which a clip will be attached is illustrated in an enlarged view from the right side. FIG. 3 is a left side front view of a drawn instrument for securely attaching a cover. Herewith illustrated are an alternate long and short dashed line A-A set as illustrated at a location where the attached portion is provided, and an alternate long and short dashed line B-B set as illustrated where the attached portion is not provided. FIG. 4 is a schematic sectional view of a drawn instrument for securely attaching a cover, illustrating a schematic section along the alternate long and short dashed line A-A in FIG. 3. FIG. 5 is schematic sectional view of a drawn instrument for securely attaching a cover, illustrating a schematic section along the alternate long and short dashed line B-B in FIG. 3. FIG. 6 is a schematic view illustrating a state where a drawn instrument for securely attaching a cover is fixed, in this example sewn to a cover. A state is illustrated where a clip has been not yet attached to a drawn portion of the drawn instrument for securely attaching a cover. FIG. 7 is a schematic view illustrating that a clip has been attached to a drawn instrument for securely attaching a cover. The sectional view of the drawn portion of the drawn instrument for securely attaching a cover corresponds to the sectional view in FIG. 4. The clip is shown by broken line for the sake of convenience. FIG. 8 is a schematic perspective view of a clip that may be attached to a drawn instrument for securely attaching a cover. FIG. 9 is a schematic sectional view of a clip that may be attached to a drawn instrument for securely attaching a cover. FIG. 10 is a schematic left side view of a clip that may be attached to a drawn instrument for securely attaching a cover. FIG. 11 is a schematic right side view of a clip that may be attached to a drawn instrument for securely attaching a cover. FIG. 12 is a schematic top view of a clip that may be attached to a drawn instrument for securely attaching a cover. FIG. 13 is a schematic view illustrating a state where a drawn instrument for securely attaching a cover has been coupled to an insert wire in a cushion member via a clip. The sectional view of a drawn instrument for securely attaching a cover, and a clip corresponds to the sectional view along alternate long and short dashed line A-A in FIG. 3. FIG. 14 is a schematic view illustrating a state where a drawn instrument for securely attaching a cover has been coupled to an insert wire in a cushion member via a clip. The sectional view of a drawn instrument for securely attaching a cover corresponds to the sectional view along alternate long and short dashed line B-B in FIG. 3. FIG. 15 is a partially enlarged view of a drawn instrument for securely attaching a cover. The sound may be weakened which may be caused when a cover shown in dashed line hits a drawn portion of a drawn instrument for securely attaching a cover.

A drawn instrument 100 shown in FIG. 1 includes a tape member 10 which is attachable to a cover and has a left surface 11 and a right surface 12, and a drawn portion 20 provided at an end of the tape member 10 in projecting manner from the left and right surfaces 11, 12 relative to the tape member 10. The drawn portion 20 extends along the end of the tape member 10. The tape member 10 may be a thin flat member elongated in front-back direction, with a generally rectangular profile when being viewed in front. The drawn portion 20 has a profile of generally cylindrical shape elongated in front-back direction. The drawn portion 20 is integrally provided to the tape member 10 to form one edge of external shape of this drawn instrument 100 or the tape member 10.

As understandable from additional reference to FIGS. 6, 13, and 14, the drawn instrument 100 may be an intermediate member which intermediate the coupling between a cover 910 and the cushion member. The drawn instrument 100 may typically be placed in a groove 951 provided at the cushion member 950. The surface of the cushion member 950 may be covered by the cover 910. The tape member 10 of the drawn instrument 100 is secured by sewing and so on to the cover 910. A clip 70 which has been already attached to the drawn portion 20 of the drawn instrument 100 may capture an insert wire 952 at the cushion member side so that it may be ensured that the cover 910 may be securely attached to the cushion member 950. Note that any method for securing the tape member 10 against the cover 910 would be adoptable, and it should not be limited to sewing and other methods such as adhesion and so on would be adoptable.

The tape member may possibly be differently named such as trim code, tape, cloth and so on, and the whole disclosure may be read and understood with one of these names. The tape member may simply be named as a cord in some cases. The tape member 10 according to this example may be made of soft material having a flexibility, and may preferably be a cloth such as a web, knit, nonwoven fabric, natural leather, artificial leather and so on, thereby sufficient strength and enough softness may be achieved. In an illustrated example, the tape member 10 is rectangular elongated in front-back direction. However, it is not necessarily limited to that profile and could be changed to any other profiles.

From a view point to maintain the lightweight property of the tape member 10, material configured from fibers may be used, but not necessarily limited thereto. From a view point to maintain the strength of the tape member 10, no hole may be provided at the tape member 10. However, the tape member 10 may be provided with holes from because of its functionality or its beauty. The tape member 10 may have the flexibility of any extent. Not limited to a single layer cloth, a layered cloth having one or more pieces of cloth may be utilized. As to fibers configuring a cloth, natural fibers, chemical fibers, synthetic fibers and so on may be listed as examples. It is known that typical examples of synthetic fibers may include nylon, polyester, acrylic and so on.

The drawn portion 20 extends and is elongated in front-back direction, and has a rod-like or cylindrical profile in general. Preferably, the drawn portion 20 may have stiffness to some extent, but may possibly have some flexibility or elasticity. In consideration of lightweight property of the drawn instrument 100, the drawn portion 20 may be made of resin, but not necessarily limited thereto. The sectional profile of the drawn portion 20 may include circular, more specifically oval. This would however be just an example, and any other sectional profile may be adopted such as differently profiled circle, triangular, rectangular, pentagon, hexagon, other polygons having higher number of corner than hexagon, star and son on. Of course, in view of possibility of being touched by a human while assembling, it may preferably be profiled to be a circle, and more preferably be profiled to be oval from a stand point of decreasing possible sound. It should be noted that, in the present specification, the term "circle" should be broadly construed to indicate "precise circle" and "oval".

The drawn portion 20 may be an elongated resin portion linearly extending in a longitudinal direction thereof in this example, but necessarily limited thereto. For example, it may possibly extend along its longitudinal direction in any manner such as zigzag, wave, arc and so on. That is, the drawn portion 20 may be any elongated member presenting any profile or any appearance, and should not be limited to the disclosed embodiment of this example. Furthermore, the drawn portion 20 might not necessarily be integral to the tape member 10 in its entire length, and may possibly partially separated from the tape member 10. Other structure may be additionally coupled to the drawn portion 20.

The drawn portion 20 may have a sectional profile occupying some degree of largeness, preferably. This may be because an attached portion 30 for clip attachment is formed by partially recessing the surface 201 of the drawn portion 20 as described below.

If the drawn portion 20 is divided by the plane PL where the tape member 10 exists or which is defined by the tape member 10 schematically shown in FIG. 1, it would be understandable that the drawn portion 20 includes a drawn portion left half 21 provided in a projected manner at the left surface side of the tape member 10 and a drawn portion right half 22 provided in a projected manner at the right surface side of the tape member 10. The drawn portion left half 21 may be a semi-columnar portion, and similarly the drawn portion right half 22 may be a semi-columnar portion, each being provided with a recessed part in correspondence with the attached portion 30. The drawn portion left half 21 and the drawn portion right half 22 would be not necessarily in mirrored symmetry, and possibly both might have different shapes.

Any securing method of the drawn portion 20 against the tape member 10 might be adoptable, but preferably insert molding might be utilized from a standpoint of securing sufficient coupling therebetween. The drawn portion 20 may be appropriately divided, for example into left and right halves, and each divided part may be fixed to the tape member 10 in any manner. For example, any approach may be utilized such as adhesion by adhesive, mechanical coupling between the divided parts of left and right to sandwich the tape member 10 and so on.

The drawn portion 20 continuously extends across the entire extent between the left end and right end of the tape member 10. Further, the drawn portion 20 is provided with an embedded bottom end of the tape member 10 or an embedded side of outer shape of the tape member 10, so that the integrity of the tape member 10 and the drawn portion 20 may be ensured, and the tape member 10 may not interfere the attaching of the clip 70 to the drawn portion 20. The bottom end of the tape member 10 is not necessarily embedded in the drawn portion 20, and it may not be embedded in the drawn portion 20 at some extents or areas as far as desired strength may be obtained. The bottom end of the tape member 10 may possibly be at a penetrated position through the drawn portion 20.

The drawn portion 20 may be provided with recesses at both left and right sides which are regularly arranged and separated in the longitudinal direction thereof, thereby the drawn portion 20 may be provided with the attached portions 30 for clip attachment that are recessed from the surface 201 of the drawn portion 20 at both left and right sides. The drawn portion 20 may have drawn rods 25 between two attached portions 30 adjacent in the longitudinal direction. This adjacent two attached portions 30 define the front-back extent of the drawn rod 25. The front-back extent of the drawn rod 25 may be greater than the front-back extent of the attached portion 30.

As will be well understood with reference to FIG. 2, each attached portion 30 has a left recess 31 which is formed by the surface 201 of the drawn portion left half 21 being recessed, and a right recess 32 which is formed by the surface 201 of the drawn portion right half 22 being recessed, thereby the attached portion 31 being configured to be recessed from the surface of the drawn rod 25 at left and right sides. Sufficient stiffness may be obtained due to that the drawn portion 20's roughly circular sectional profile, i.e. oval sectional profile is maintained at an area where the attached portion 30 is not provided. The attached portions 30 are separated at the drawn portion 20 of oval sectional profile so that some extent of stiffness may be obtained regardless of the formation of the recessed attached portion 30.

In the present embodiment, the drawn portion 20 may be further provided with walls 40 which are arranged and separated along the longitudinal direction and which are projected at both left and right sides. The wall 30 may be projected at both left and right sides respectively from the left and right surfaces 11, 12 of the tape member 10. The wall 40 may be provided adjacent to the attached portion 30, and it may be provided above the attached portion 30, in other words at "inwardly of tape member" relative to the attached portion 30. It should be noted that "inwardly of tape member" means a direction heading from a side edge or an end of the tape member 10 to the inward of the tape member 10 outlined by the outer circumference of the tape member 10. In this example, it is equal to a direction which traverses the end of the tape member 10 where the drawn portion 20 is provided to reach a point over the tape member 10, i.e. a direction of arrow D10 shown in FIG. 1. The arrow D10 is directed to traverse the drawn portion 20 to reach a point over the member 10 in a plane PL10 where the tape member 10 in a flat condition exists or which is defined by the tape member 10 in a flat condition. Note that the attached portion 30 is provided outwardly of tape member relative to the wall 40.

Further description may follow as an alternative or in addition. The outwardly of tape member may be a direction equal to or extend along a direction heading away from the cover from any location where the tape member is not overlapped by the cover. The inwardly of tape member may be an opposite direction to the direction of outwardly of tape member, and may be a direction equal to or extend along a direction heading closer to the cover from any location where the tape member is not overlapped by the cover. The directions of inwardly of tape member and outwardly of tape member may be equal to the up-down direction.

According to the above described configuration, it may be easier to attach the clip 70 to the drawn portion 20. This is because the attachment position of the clip 70 is determined at the drawn portion 20. In some cases, the projecting wall 40 may serve as a mark where the clip 70 should be attached. It would be possible to facilitate the efficiency of securement of cover 910 by attaching the clip 70 at the attached portion 30 after seeing the place of the attached portion 30 or the wall 40.

Viewing from a standpoint where stiffness is required for the drawn portion 20, the recessed attached portion 30 is provided at the drawn portion 20 such that the stiffness of the drawn portion 20 may be lowered. However, the wall 40 may compensate for this lowered stiffness at a part of the drawn portion 20 where the attached portion 30 is provided. At this instance, the wall 40 is positioned inwardly of tape member relative to the attached portion 30 so that the attachment of the clip 70 to the attached portion 30 may not be disturbed.

Furthermore, provided that any external force was applied to the clip 70 from above in a state where the clip 70 has been attached to the attached portion 30, such external force may be applied to the wall 40 not the clip 70 so that the removal of the clip 70 from the attached portion 30 may be suppressed.

Note that, in a case of patent document 2, the clip can be provided at a constant location of the flag, reducing the puzzlement regarding the attachment position of clip. However, with respect to the attachment of clip, this necessarily requires holes to be provided at the flag, possibly lowering the stiffness thereof which is inferior and invites increased burden for producing such flags. In a case of patent document 2, the displacement of clip after being attached is not sufficiently restricted, allowing easier shaking of clip and possibly requiring unignorable time for the securing process.

As will be understood in light of the following description, in the present embodiment and in a condition where the clip 70 has been attached to the attached portion 30, the displacement of the clip 70 in front-back direction is suitably restricted by the drawn rods 25 placed frontward and rearward of the attached portion 30, enhancing the position stability of the clip 70 after being attached to the attached portion 30. Furthermore, in a condition where the clip 70 has been attached to the attached portion 30, the clip 70's displacement of inward of tape member is restricted by the wall 40, preferably restricting the clip 70's displacement of inwardly of tape member either. Accordingly, easier and more accurate securing process may be facilitated. Additionally explained just to make sure, the downward displacement of clip 70 is restricted by a taper portion 34 of the attached portion 30.

Note that, as specifically shown in FIG. 2, each wall 40 provided at the drawn portion 20 is divided by the tape member 10 into left and right portions, and thus includes a wall left half 41 provided in a projected manner from the left surface 11 of the tape member 10, and a wall right half 42 provided in a projected manner from the right surface 12 of the tape member 10. Each wall left half 41 is provided adjacent to the left recess 31, and is provided above the left recess 31 i.e. positioned inwardly of tape member relative to the left recess 31. Each wall right half 42 is provided adjacent to the right recess 32, and is provided above the right recess 32 i.e. positioned inwardly of tape member relative to the right recess 32.

Preferably and as may be seen in FIGS. 4 and 5, the sectional profile of the wall 40 may be triangular, in other words ridge-like or mushroom-like, and further in other words upwardly tapered to be narrower, not necessarily limited though. With such a configuration, the reduction of sound caused due to the collision of the cover 910 may be facilitated as described below. Regarding this issue, the top surface of the wall 40, i.e. the surface positioned inwardly of tape member may preferably be curbed, i.e. it may be a curved or sloped surface which approaches the attached portion 30 at bottom side as it extends away from the left or right surfaces 11, 12 of the tape member 10 in left-right direction. In other words, as shown in FIGS. 4 and 5, the top surface 411 of the wall left half 41 may preferably be a moderately curved surface, and similarly the top surface 421 of the wall right half 42 may preferably be a moderately curved surface. Accordingly, the above-described reduction of sound may be effectively facilitated. The top surface 411 of the wall left half 41 and the top surface 421 of the wall right half 42 may not necessarily be the curved surface and may be a linear sloped surface. The bottom surface 412 of the wall left half 41 is equal to the side surface of the left lateral groove 51 extending in front-back direction, and similarly the bottom surface 422 of the wall right half 42 is equal to the side surface of the right lateral groove 51 extending in front-back direction. Note that the left lateral groove 51 and the right lateral groove 52 may be together referred to as the lateral groove 50 in this specification.

In this example, the wall left half 41 and the wall right half 42 are configured to be in mirrored symmetry with respect to the plane PL10 where the tape member 10 exists or which is defined by the tape member 10, not necessarily limited to though. The height of the wall left half 41 from the left surface 11 of the tape member 10 is equal to the height of the wall right half 42 from the right surface 12 of the tape member 10, but not necessarily limited to through. The front-back width of the wall left half 41 is equal to the front-back width of the wall right half 42, but not necessarily limited to.

As a preferred example, regarding a specific profile of the attached portion 30, description will follow as below particularly with reference to FIG. 4. As shown in FIG. 4, the attached portion 30 includes a narrowed portion 33 directly coupled to the wall 40, and a tapered portion 34 coupled to the wall 40 at least via the narrowed portion 33. The narrowed portion 33 is configured to be narrower in width by its left-right width being reduced due to the left lateral groove 51 directly below the wall left half 41 and the right lateral groove 52 directly below the wall right half 42. The tapered portion 34 may have a narrowed profile as extending away from the narrowed portion 33 or the wall 40, and its sectional profile may be a reversed triangular in comparison to the wall 40. The attached portion 30 may be so configured to include the narrowed portion 33 and the tapered portion 34 so that it can be adapted for engagement with existing clips 70. Note that the lateral groove 50 is provided between the wall 40 and the tapered portion 34. More specifically, the left lateral groove 51 is provided between the wall left half 41 and the rod left half, and the right lateral groove 52 is provided between the wall right half 42 and the rod right half.

As will be understood from following descriptions, when the clip 70 is attached to the attached portion 30, the tapered portion 34 serves to widen the spacing between left arm 71 and right arm 72 of the clip 70. The tapered portion 34 has a moderately increased left-right width from the bottom to the top so that widening the opening between the left arm 71 and the right arm 72 of the clip 70 in opposite direction may be smoothly performed. The left-right width of the tapered portion 34 gradually decreases from the top to the bottom. A first claw 715 of the first arm 71 may slide on the left sloped surface of the tapered portion 34, and a second claw 725 of the second arm 72 may slide on the right sloped surface of the tapered portion 34. The left lateral groove 51 and the right lateral groove 52 positioned at left and right of the narrowed portion 33 above the tapered portion 34 may serve as runouts for the first claw 715 of the left arm 71 and the second claw 725 of the right arm 72 which have passed over the tapered portion 34, thereby the attachment of the clip 70 to the attached portion 30 ends. The removal of the clip 70 from the attached portion 30 may be restricted by the tapered portion 34 of the attached portion 30 when the first claw 715 and the second claw 724 are respectively arranged in the left lateral groove 51 and the right lateral groove 52. Preferably, after the clip 70 being attached to the attached portion 30 of the drawn portion 20, the clip 70 is firmly secured to the drawn portion 20 and the removal from the drawn portion 20 is not easily possible, not necessarily limited to through.

Again, when the clip 70 has been attached to the attached portion 30, the front-back displacement of the clip 70 is preferably restricted by the drawn rods 25 positioned in front and back of the attached portion 30, thereby enhancing position stability of the clip 70 after being attached to the attached portion 30. Furthermore, in a condition where the clip 70 has been attached to the attached portion 30, the clip 70's displacement of inward of tape member is restricted by the wall 40, preferably restricting the clip 70's displacement of inwardly of tape member either.

It might be recognized that the structures of the narrowed portion 33 and the tapered portion 34 may be divided on the basis of left and right sides relative to the tape member 10. In this case, the narrowed portion 33 may include the narrowed portion left half and the narrowed portion right half, and these are divided by the tape member 10. The tapered portion 34 may include tapered portion left half and the tapered portion right half. These are partially divided by the tape member 10, and the remainder thereof are integrally coupled specifically at the bottom of the tapered portion 34 without being divided by the tape member 10. Such configuration may be suitable from a standpoint of firm securement between the tape member 10 and the drawn portion 20. Of course, other embodiments may be envisaged.

The front-back lengths of the left lateral groove 51 and the right lateral groove 52 are identical, but not necessarily limited to. The depths of the left lateral groove 51 and the right lateral groove 52 are identical, but not necessarily limited to. The left-right length of the left lateral groove 51 is slightly greater than the left-right width of the first claw 715. The left-right length of the right lateral groove 52 is slightly greater than the left-right width of the second claw 716.

As will be understood with reference to FIG. 4, the tapered portion 34 is provided with a left vertical groove 61 and a right vertical groove 62 at left and right sides. The left vertical groove 61 and the right vertical groove 62 extend in the up-down direction at the center of the tapered portion 34 in the front-back direction. As the vertical grooves 61, 62 may be provided as such, the clip 70 may be allowed to have a claw at the inner wall face of the arm to effectively restrict the front-back displacement between the attached portion 30 and the clip 70. Note that, the top end of each vertical groove 61, 62 is in communication with each lateral groove 51, 52. The depth of each vertical groove 61, 62 is shallower than the depth of each lateral groove 51, 52. In the prevent specification, the left vertical groove 61 and the right vertical groove 62 may be together referred to as the vertical groove 60.

As will be understood with reference to FIGS. 4 and 5, the tapered portion 34 may have a pair of shoulders 340 projecting leftward or rightward crossing the surface 201 of the drawn rod 25 from the inward of the recess of the attached portion 30. In particular, the tapered portion 34 may have a left shoulder 341 projecting leftward crossing the surface 201 of the drawn rod 25 and a right shoulder 342 projecting rightward crossing the surface 201 of the drawn rod 25. The left shoulder 341 and the right shoulder 342 together may be referred to as the shoulder 340.

The shoulder 340 may be projected relative to the surface 201 of the drawn rod 25 so that sufficient engagement between the attached portion 30 and the clip 70 may be obtained, facilitating the suppression of removal of the clip 70 from the attached portion 30. Furthermore, the tapered portion 34 may have a leg 345 downwardly projecting from the surface 201 of the drawn rod 25, thereby insuring that the attached portion 30 may be much firmly held by the later-described holder 74 of the clip 70.

As schematically illustrated in FIG. 4, the leftward top position of the wall left half 41 is equal to the top position of the left shoulder 341, meaning that both top positions are arranged in coplanar, i.e. in the same plane PL21 schematically shown in FIG. 4. Note that the plane Pl21 is a geometric plane leftward translated and spaced at a predetermined distance from the left surface 11 of the tape member 10, and is not an existing surface of any member or portion. The same descriptions made for the wall left half 41 and the left shoulder 341 may apply to the wall right half 42 and the right shoulder 342 where the plane PL22 corresponds to the plane PL21.

The drawn instrument 100 may be sewn to the cover 910 along a sewing line 920 as illustrated in FIG. 6. Further the clip 70 may be attached to the instrument 100 as shown in FIG. 7.

Any configuration for clips 70 attached to the drawn instrument 100 may be adoptable, and various other clips than the disclosed examples may be utilized. The exemplary but preferable clip 70 illustrated in FIGS. 8 to 12 may have a holder 74 configured to hold the tapered portion 34 of the attached portion 30; a hook 75 coupled to the bottom of the holder 74; jig-engaged portion 76 provided rightward of the hook 75; and a hook closure 77 provided leftward of the hook 75. The hook 75 opens at its left side and, accordingly the hook closure 77 is provided leftward relative to the hook 75 and the jig-engaged portion 76 is provided at the right side relative to the hook 75 which is opposite to the hook closure 77.

The holder 74 includes a left arm 71, right arm 72, and bottom 73 coupling the respective base ends of the arms 71, 72. The left arm 71 and the right arm 72 are provided to upwardly extend from the bottom 73, and the accommodating space 745 for accommodating the tapered portion 34 is defined by the opposing left arm 71 and the right arm 72.

The top portion of the left arm 71 may be bent toward the right arm 72 so that the first claw 715 may be provided. The first claw 715 may be inserted into the left lateral groove 51 of the attached portion 30. The top portion of the right arm 72 may be bent toward the left arm 71 so that the second claw 725 may be provided. The second claw 725 may be inserted into the right lateral groove 52 of the attached portion 30.

As particularly illustrated in FIG. 9, an entrance 744 opens between the first claw 715 and the second claw 725 which may be an insertion mouth through which the tapered portion 34 may be inserted. It could be said that the left-right width W744 of the entrance 744 may be defined by the respective projection of the first claw 715 and the second claw 725.

In the present embodiment, the left arm 71 and the second arm 72 may be respectively provided with third claw 716 and forth claw 726 projecting into the accommodating space 745 between the arms 71, 72. In comparison to the first claw 715 and the second claw 725, the widths of third claw 716 and the forth claw 726 are narrower in front-back direction orthogonal to the depth direction directed from the entrance 744 toward the bottom 73 and left-right width W744 direction of the entrance 744. In particular, each of the third claw 716 and the forth claw 726 may be a plate having a thin thickness in front-back direction. Accordingly, coupling between the holder 74 and the tapered portion 34 may be strengthened without greatly disrupting the insertion of the tapered portion 34 into the holder 74.

As can be seen from FIGS. 8 to 12, a bulge may preferably be provided at the inner face of the holder 74 so that the backlash of the tapered portion 34 in the holder 74 may be suppressed so that the contacting between the holder 74 and the tapered portion 34 may be enhanced.

The hook 75 may include J-shaped portion with which the insert wire 952 at the cushion side may engage. The jig-engaged portion 76 may include a wall opposed to the hook 75 so that a jig-insertion space is defined between the hook 75 and the wall. The bottom end of the wall of the jig-engaged portion 86 is coupled to the bottom end of the hook 75. The coupling of the hook 75 and the jig-engaged portion 76 forms a flat guide surface 782 for guiding the insert wire 952. The hook closure 77 may be a portion which restricts the insert wire entered into the hook 75 from moving out of hook 75. The base end of the hook closure 77 may be coupled to the external surface of the left arm 71 and the extremity thereof is positioned further downward from the tip of the J-shaped portion included in the hook 75. A guide surface 781 is provided at the extremity of the hook closure 77 at its opposed surface in relation to the hook 75 so that the insert wire may possibly be guided by the guide surface 781 and the guide surface 782 being opposed thereto.

As shown in FIGS. 13 and 14, a not-illustrated cover 910 may be drawn to the insert wire 952 via a unit in which the clip 70 has been attached to the attached portion 30 of the drawn portion 20 of the drawn instrument 100. When a jig is inserted between the jig-engaged portion 76 and the hook 75 of the clip 70 being attached to the drawn instrument 100 to downwardly move the clip 70 one by one to capture the insert wire 952, the cover 910 may accidentally hit the drawn portion 20 as shown in FIG. 15 due to gravity or tension or irregular force applied during securing. In the present embodiment, the wall 40 with curved top surface is provided so that reduction of sound caused due to the hitting may be facilitated. This may be because, when being contacted by the cover 910, a tangential line at a contact point between the curved top surface and the cover 910 may present an obtuse angle greater than a right angle.

Second Embodiment

Figure 16:
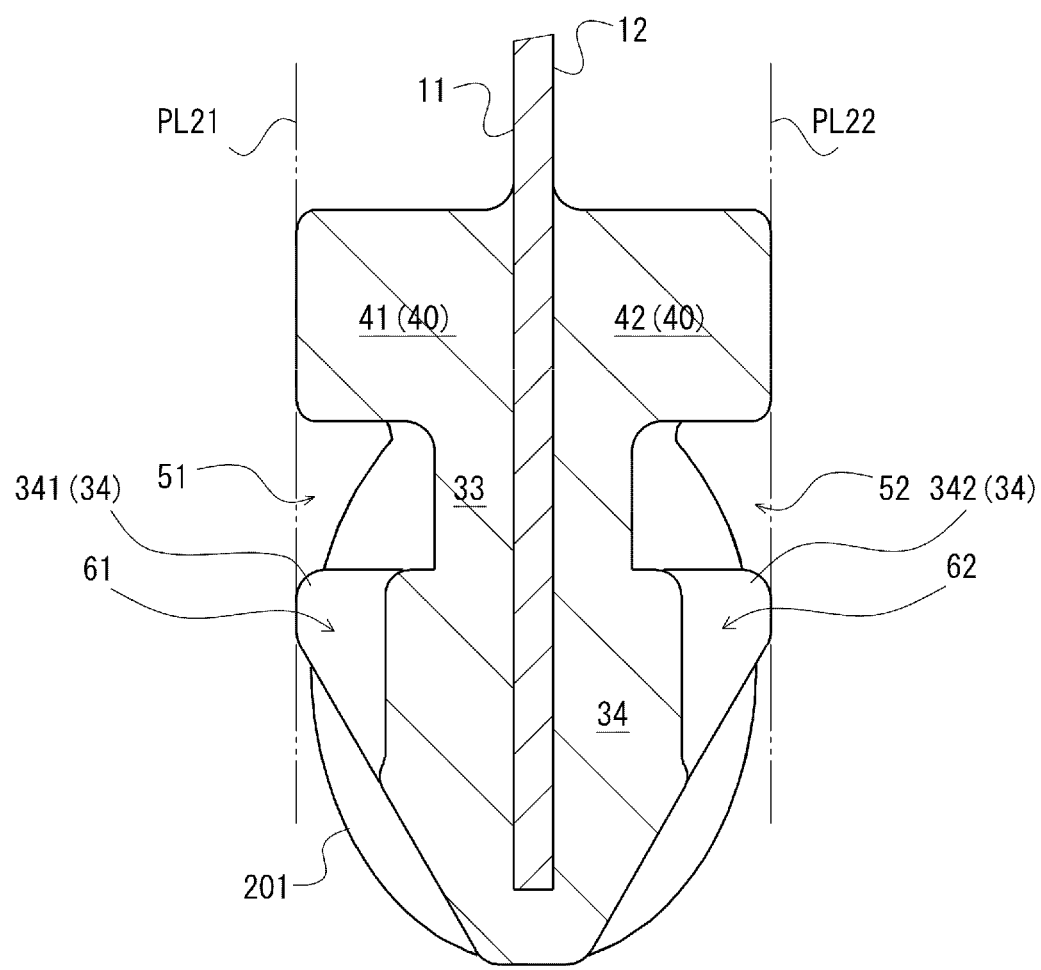
FIG. 16 is a schematic view of a drawn instrument for securely attaching a cover according to a second embodiment of the present invention.

A Second embodiment will be described with reference to FIG. 16. FIG. 16 is a schematic view of a drawn instrument for securely attaching a cover, illustrating a sectional view corresponding to A-A in FIG. 3. In the present embodiment differently shaped wall 40 compared to that of the first embodiment is adopted, but similar effect with that of the first embodiment may be achieved. Note that, in the example of FIG. 16, the sectional profile of the wall 40 is rectangular. It would be possible to adopt such a differently shaped wall 40 other than triangular.

As shown in FIG. 16, both of the wall left half 41 and the wall right half 42 presents rectangular sectional profile. The wall left half 41 and the wall right half 42 are in mirrored symmetry with respect to the plane PL10 in this embodiment either, but not necessarily limited to this arrangement.

Third Embodiment

Figure 17:
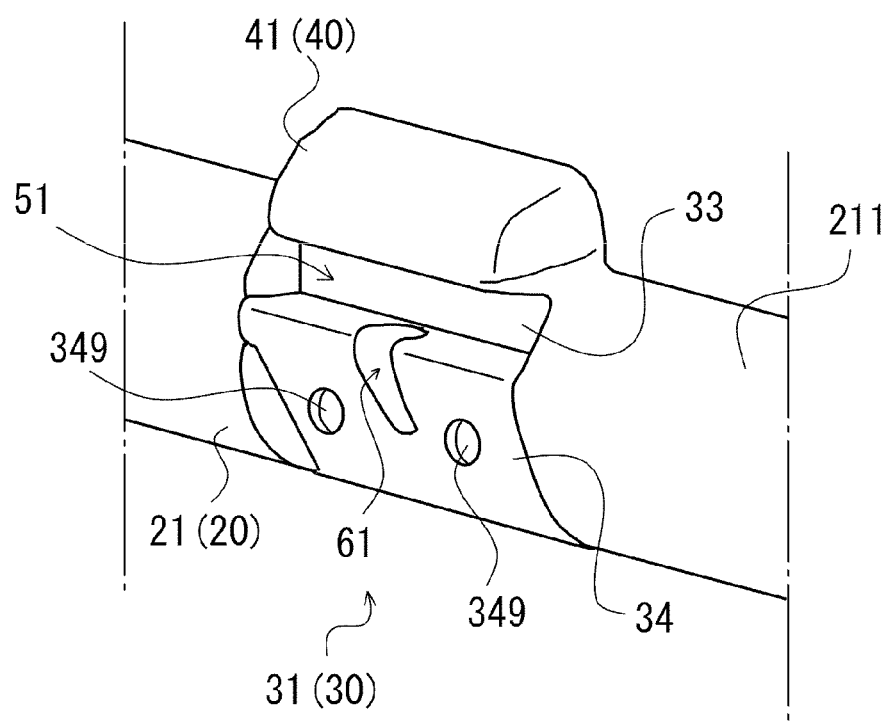
FIG. 17 is a partial perspective view of a drawn instrument for securely attaching a cover according to a third embodiment of the present invention. An attached portion to which a clip will be attached is shown from left side in an enlarged manner.

A third embodiment will be described with reference to FIG. 17. FIG. 17 is a partial perspective view of a drawn instrument for securely attaching a cover. An attached portion to which a clip will be attached is shown from left side in an enlarged manner.

In this embodiment, slots 349 are provided at the tapered portion 34 of the attached portion 30 at both left and right sides. The slot 349 has a depth reaching to the left surface 11 or right surface 12 of the tape member 10. The left surface 11 or the right surface 12 of the tape member 10 can be seen through the slot 349. The yield ratio of the drawn instrument 100 may be lowered if the position of the tape member 10 changes during the insert molding in accordance with supply pressure of melted resin introduced into the mold cavity from the gate. In light of this, in the present embodiment, positioning pins are adopted and melted resin may be supplied into the cavity while the tape member 10 is positioned in the mold by the positioning pins. Accordingly, the reduction of yield rate may be avoided even when the drawn instrument 100 configured in accordance with the first and second embodiments may be produced.

The slots 349 are provided at the attached portion 30 which is to be covered by the clip 70, resulting in that the slots 349 may not appear in exterior appearance after the clip being attached thereto and thus enhancing the aesthetic appearance of the drawn instrument 100. The reduction of amount of resin material may be facilitated due to the slots 349.

In an alternate example, the slots 349 may be provided at the drawn portion 20 other than the attached portion 30. The slot 349 may be provided at the left side only or right side only or both of the left and right sides. Any number of slots 349 may be employed. Accordingly, it should not be limited to two as illustrated but it may possibly be one.

In view of the above teachings, the skilled person could add various modifications to the respective embodiments. The reference numbers introduced in Claims are just for a reference, and should not be referenced for the purpose of narrowly construing claims. "Comprising", "including", and "having" are basically non-restrictive terms unless otherwise indicated, and would include other non-recited elements additionally to recited elements. The term indicating a specific shape should not indicate such a specific shape only but would indicate a deformation thereof within any extent.

REFERENCE SIGNS LIST

100 Drawn instrument for attaching a cover
10 Tape member
11 Left surface
12 Right surface
20 Drawn portion
201 Surface
30 Attached portion
33 Narrowed portion
34 Tapered portion
40 Wall

The invention claimed is:

1. A drawn instrument for securely attaching a cover comprising:
a tape member having left and right surfaces and attachable to a cover; and
a drawn portion provided at the end of the tape member and projected from left and right surfaces of the tape member, the drawn portion extending along the end of the tape member and having left and right surfaces, wherein
the drawn portion comprises:
a plurality of attached portions that are separated along a longitudinal direction of the drawn portion, each attached portion being recessed at the left or right surface of the drawn portion; and
a plurality of walls separated along the longitudinal direction of the drawn portion and projected at both left and right sides, each wall extending away from the tape member leftward or rightward, wherein
at both left and right sides each wall is provided adjacent to the attached portion and positioned inwardly of the tape member relative to the attached portion.

2. The drawn instrument for securely attaching a cover according to claim 1, wherein a surface of each wall arranged inwardly of the tape member is a curved surface or sloped surface which approaches the attached portion as it extends away from the left or right surface of the tape member.

3. The drawn instrument for securely attaching a cover according to claim 1, wherein each of the attached portions comprises a tapered portion to which a clip is attachable, wherein a lateral groove is provided between the wall and the tapered portion, and wherein the left-right width of the tapered portion gradually narrows as the tapered portion extends away from the wall.

4. The drawn instrument for securely attaching a cover according to claim 3, wherein the tapered portion is provided with a vertical groove which is in communication with the lateral groove and extends away from the wall.

5. A unit comprising:
a drawn instrument for securely attaching a cover according to claim 1; and
a plurality of clips, each of which is attachable to one of the attached portions of the drawn instrument for securely attaching a cover.

6. The drawn instrument for securely attaching a cover according to claim 1, wherein a sectional profile of the drawn portion includes a substantially circular or oval profile.

7. The drawn instrument for securely attaching a cover according to claim 1, wherein the drawn portion includes a drawn rod, and the drawn rod is interposed between adjacent attached portions in the longitudinal direction of the drawn portion.

8. The drawn instrument for securely attaching a cover according to claim 1, wherein each wall serves as a mark which indicates a place where a clip should be attached.

9. The drawn instrument for securely attaching a cover according to claim 3, wherein the lateral groove is recessed at the left or right surface of the drawn portion.

10. The drawn instrument for securely attaching a cover according to claim 4, wherein the vertical groove is recessed at a surface of the tapered portion.

11. The drawn instrument for securely attaching a cover according to claim 4, wherein the vertical groove is shallower than the lateral groove.

12. The drawn instrument for securely attaching a cover according to claim 3, wherein a portion of the drawn portion exists between the lateral groove and the tape member or between the vertical groove and the tape member.

13. The drawn instrument for securely attaching a cover according to claim 3, wherein the drawn portion includes a drawn rod, and the tapered portion includes a shoulder projecting leftward or rightward relative to a surface of the drawn rod.

\* \* \* \* \*

UNITED STATES PATENT AND TRADEMARK OFFICE
CERTIFICATE OF CORRECTION

PATENT NO.         : 9,743,777 B2
APPLICATION NO.    : 15/030487
DATED              : August 29, 2017
INVENTOR(S)        : Shinsuke Saiga et al.

It is certified that error appears in the above-identified patent and that said Letters Patent is hereby corrected as shown below:

In the Specification

In Column 1, Line 3, Below "ATTACHING A COVER" insert -- This application is a national stage application of PCT/JP2013/080482, which is incorporated herein by reference. --.

In Column 2, Line 43, delete "FIG. 2" and insert -- FIG. 2, --, therefor.

In Column 11, Line 37, delete "Pl21" and insert -- PL21 --, therefor.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*